United States Patent [19]

Zawada et al.

[11] Patent Number: 5,363,079
[45] Date of Patent: Nov. 8, 1994

[54] PROTECTIVE SNAP-TOGETHER ENCLOSURE FOR CURRENT TRANSFORMERS

[75] Inventors: Patrick J. Zawada, Menomonee Falls, Wis.; Peter D. Raine; Benjamin C. Lindo, both of Cedar Rapids, Iowa

[73] Assignee: Square D Company, Palatine, Ill.

[21] Appl. No.: 35,538

[22] Filed: Mar. 22, 1993

Related U.S. Application Data

[63] Continuation of Ser. No. 669,827, Mar. 15, 1991, abandoned.

[51] Int. Cl.⁵ ............................................. H01F 27/02
[52] U.S. Cl. ..................... 336/92; 336/175; 336/192; 361/731; 439/752
[58] Field of Search ................. 336/174, 175, 176, 92, 336/90; 174/52.1, 92, 51; 220/4.02, 4.25, 4.24; 439/733, 869, 752; 361/728, 752, 826, 731

[56] References Cited

U.S. PATENT DOCUMENTS

| | | |
|---|---|---|
| 1,415,505 | 5/1922 | Angus .................................. 336/174 |
| 2,644,135 | 6/1953 | Schnoll ................................ 336/174 |
| 2,671,845 | 3/1954 | Chemy ................................. 336/174 |
| 2,894,056 | 7/1959 | Bogese .................................. 174/92 |
| 3,112,148 | 11/1963 | Wochner ............................... 174/92 |
| 3,757,031 | 9/1973 | Izraeli .................................... 174/92 |
| 4,029,896 | 6/1977 | Skinner ................................. 174/92 |
| 4,049,357 | 9/1977 | Hamisch, Jr. ......................... 174/92 |
| 4,219,693 | 8/1980 | French ................................... 174/92 |
| 4,260,850 | 4/1981 | Brown et al. ....................... 174/52.1 |
| 4,426,108 | 1/1984 | Kesselman ............................ 174/92 |
| 4,527,140 | 7/1985 | Kimura et al. ...................... 336/175 |
| 4,612,680 | 9/1986 | Daiguji .................................. 174/92 |
| 4,885,559 | 12/1989 | Nakano ................................. 336/92 |

*Primary Examiner*—Thomas J. Kozma
*Attorney, Agent, or Firm*—Larry I. Golden; Kareem M. Irfan; Wayne Stoppelmoor, Jr.

[57] ABSTRACT

There is provided an enclosure that encapsulates a current transformer by utilizing a snap together design while allowing for electrical coupling between the transformer and external wiring. Two housing members will snap together while capturing the transformer in a rigid fashion to avoid excess vibration or friction, which could fatigue the transformer's wiring.

10 Claims, 5 Drawing Sheets

PROTECTIVE SNAP-TOGETHER ENCLOSURE FOR CURRENT TRANSFORMERS

This application is a continuation of application Ser. No. 07/669,827, filed Mar. 15, 1991, now abandoned.

FIELD OF THE INVENTION

The present invention generally relates to enclosures for encapsulating electrical transformers and, more particularly, relates to easy to assemble enclosures for encapsulating neutral current transformers.

BACKGROUND OF THE INVENTION

A neutral current transformer is a device located on the neutral bus of a three-phase circuit breaker having a four-wire ground fault scheme and electronic trip unit. The current transformer is used to detect differences between the current flowing through the neutral bus and the three phases. The current transformer must be protected from potential hazards in its immediate environment with some type of sealing enclosure.

Some current transformer assemblies are presently sealed by pouring epoxy resin into a molded cup which houses the transformer, completely surrounding the transformer coil. Epoxy is used because it prevents shock of impact or vibrations from affecting the function of the current transformer. However, using epoxy to encapsulate the current transformer, is a time consuming process, and further prevents subsequent repairs to the transformer.

Another means for encapsulating a current transformer is to fasten two separate enclosures together, using special screws or fasteners. This assembly requires several fastening parts and is a time consuming assembly process.

Accordingly, there is a need for an effective and efficient means for providing a protective enclosure surrounding a current transformer and for providing quick assembly and accessibility for repairs.

SUMMARY OF THE INVENTION

It is a general object of the present invention to provide a means for encapsulating a current transformer.

It is a more specific object of the present invention to provide an enclosure that solves the problems of the prior art by utilizing an easy to assemble design. Two housing members are provided that will snap together, encapsulating the current transformer, while positioning the transformer in a rigid fashion to avoid excess vibration or friction, which could fatigue the transformer's wiring. Ideally, the two housing members are substantially similar in shape, however this is not necessary.

The need for special screws or fasteners has been eliminated with the present invention. The snap together enclosure design allows quick disassembly for rework with the aid of a special disassembly fixture. The present invention is virtually tamper resistant, compared to the screw together design of the prior art, and any attempt to open the enclosure, without the aid of a special disassembly tool, will likely result in the enclosure being damaged or destroyed, forcing replacement.

In accordance with one aspect of this invention, there is provided an enclosure for encapsulating an electrical transformer that comprises a first housing member having a hollow cavity therein, a second housing member having a hollow cavity therein, and means integral with the first and second housing members for securing the members together and securing the transformer within the enclosure.

In accordance with another aspect of this invention, there is provided an enclosure for encapsulating an electrical transformer that comprises a first housing member having a hollow cavity therein, a second housing member having a hollow cavity therein, and means integral with the first and second housing members for securing the members together and securing the transformer within the enclosure. The enclosure also comprises a means disposed on the first and second housing members for electrically coupling external wiring to the encapsulated transformer.

In accordance with another aspect of this invention, there is provided a transformer assembly comprising a current carrying means, a transformer coupled on the current carrying means, a plurality of wire leads extending from the transformer, a first housing member having a hollow cavity therein, the first housing member also having an opening therein for insertion of the current carrying means, a second housing member having a hollow cavity therein, the second housing member also having an opening therein for insertion of the current carrying means. The assembly also comprises a means integral with the first and second housing members for securing the members together and securing the transformer within the first and second housing members and means for electrically coupling external wiring to the transformer therein.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

Figure 1:
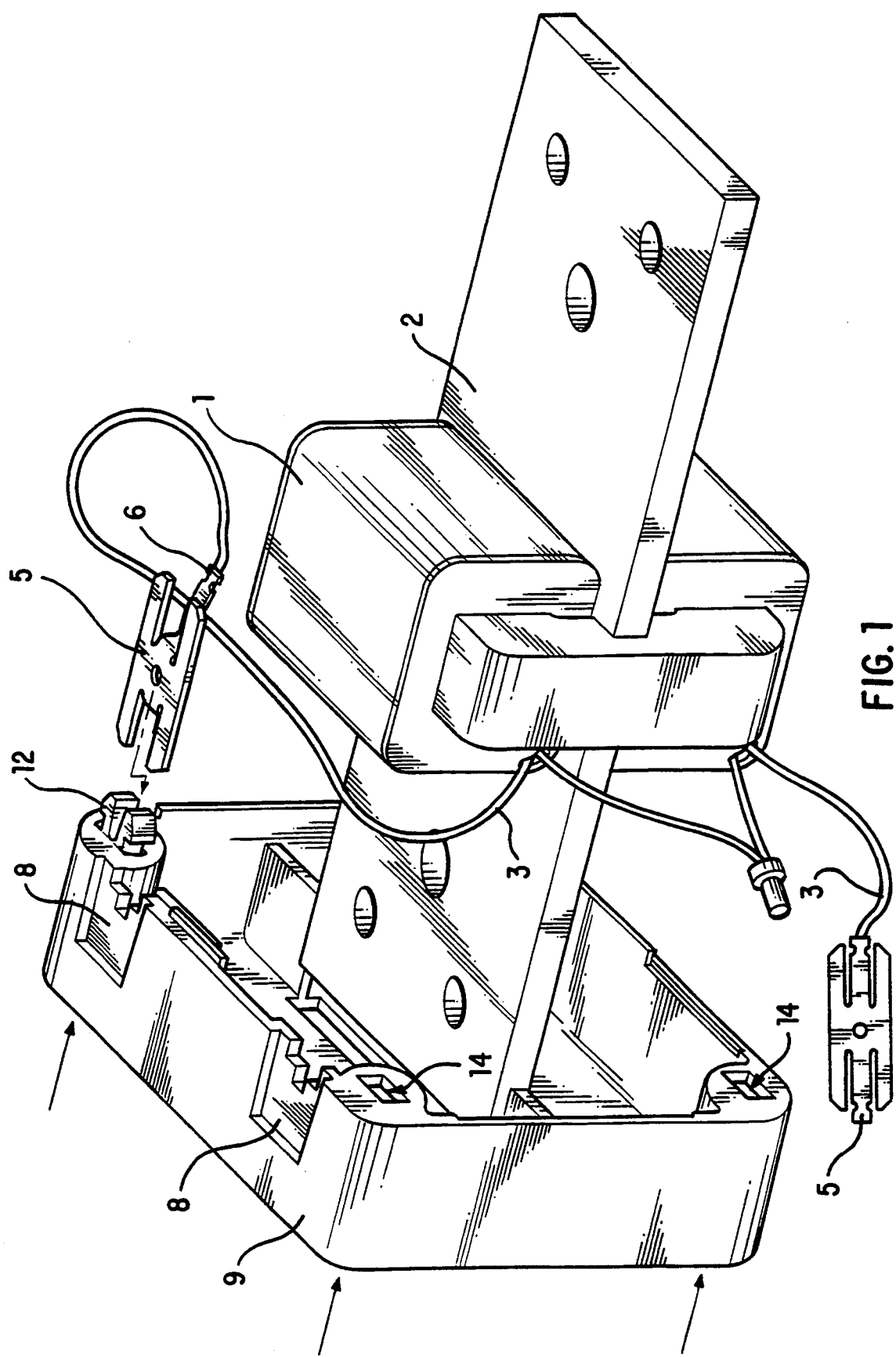
FIG. 1 illustrates a partial view of a portion of the present invention.

Referring to FIG. 1, a current transformer 1 is shown coupled to a current carrying bus bar 2. Transformer leads 3 extend from the transformer 1 to conductive wire terminals 5 where they are soldered to internal tips 6. Terminals 5 slide onto reliefs 8 in the wall of first housing member 9. The terminals may be placed on the reliefs prior to soldering the leads, acting as a temporary fixture. A commonly used crimp on connector may be fastened to the transformer leads and then connected to the wire terminals.

Figure 2:
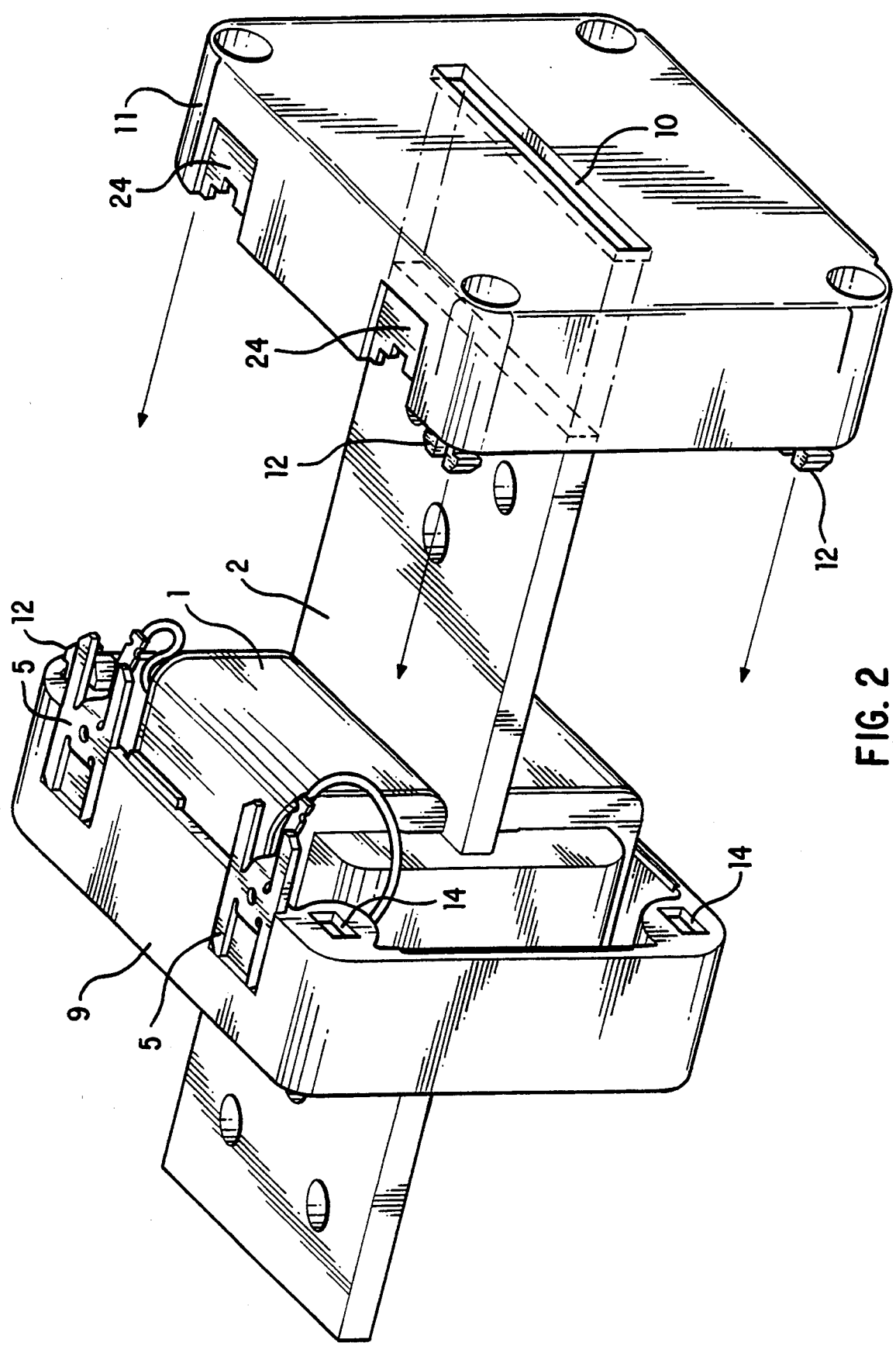
FIG. 2 illustrates a partially assembled embodiment of the present invention.
Figure 6:
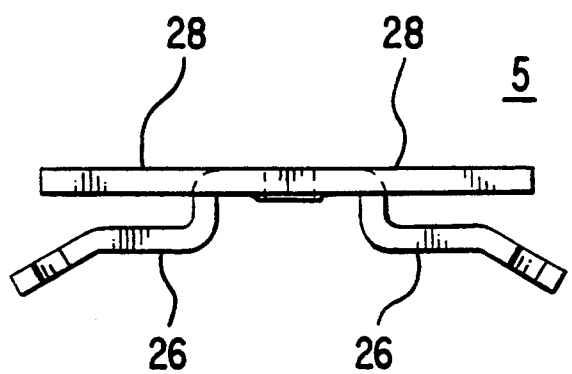
FIG. 6 shows a side view of the wire terminal used with the present invention.
Figure 7:
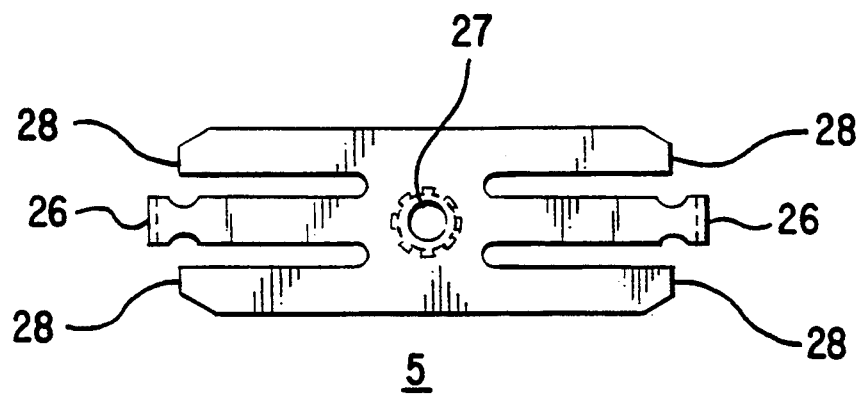
FIG. 7 illustrates the top view of the wire terminal used with the present invention.

FIG. 2 shows the first housing member 9 with two wire terminals 5 clipped into place, with the prongs 26, 28, shown in FIG. 6 and FIG. 7 (top view), of the terminals straddling either side of the housing member wall in a slight interference fit to hold them in place during assembly. Bus bar 2 has been inserted through an opening within first housing member similar to opening 10 located within second housing member 11. The opening is configured to provide a snug fit with minimal clearance around bus bar 2, to prevent foreign objects from entering the enclosure.

The second housing member 11 slips over the opposite end of the bus bar in similar fashion to the first housing member, and is moved toward first housing member 9. The first and second housing members are positioned such that the male snaps 12 are aligned with the female receptacles 14. The housing members are pushed towards each other until the male snaps engage into the female receptacles. With the male snap and female receptacle arrangement, the need for fastening hardware, such as screws, rivets, etc., is eliminated.

As the first and second housing members are brought together, the wire terminals 5 guide themselves onto the reliefs 24 of second housing member 11. The bent prongs 26, shown in FIG. 6 and FIG. 7 (top view), slide onto the interior side of the enclosure wall and prevents the wire terminals from being pulled out of the assembly. External prongs 28, shown in FIG. 6, are positioned outside of the enclosure to prevent the wire terminals from being pushed into the enclosure assembly. Once the assembly is complete, the wire terminals are held rigidly in place, and can not be repositioned or removed unless the enclosure is reopened.

Figure 3:
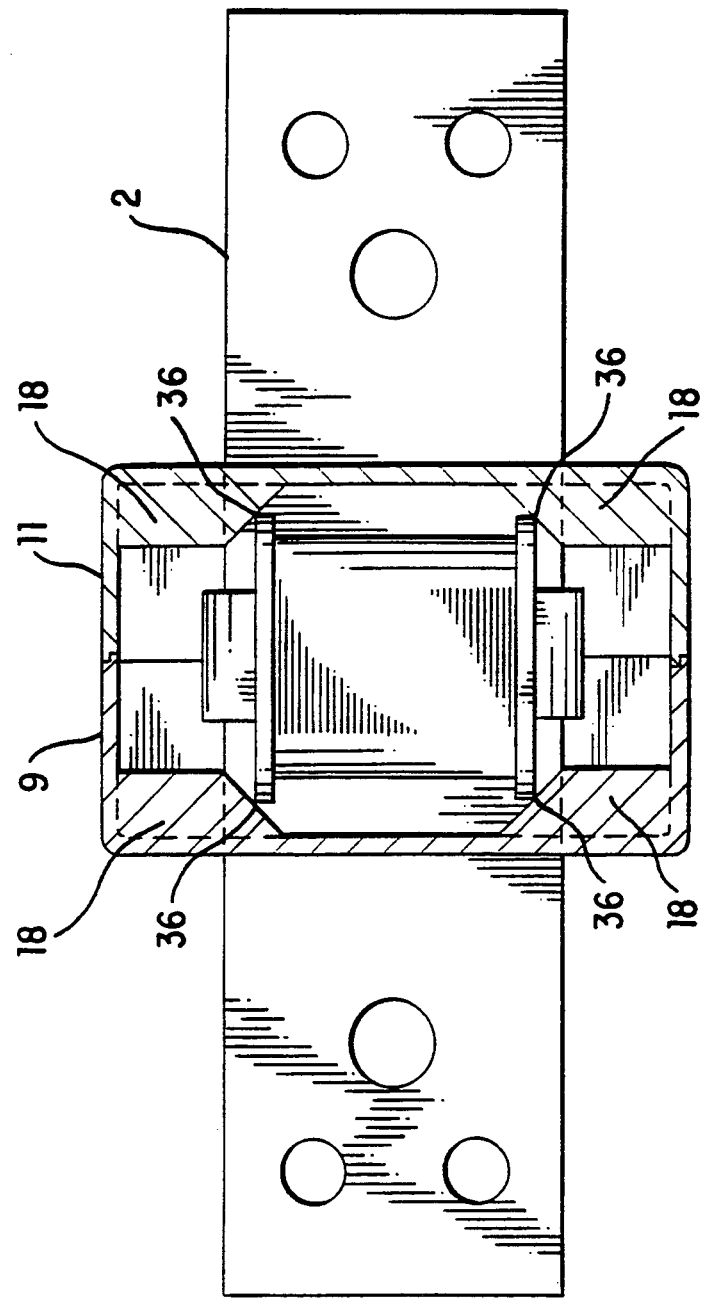
FIG. 3 is a cross sectional view of an assembled version of the present invention taken generally along the line 3—3 of FIG. 5.

FIG. 3 shows the transformer nested inside the enclosure with the bus bar protruding form either side. Molded gussets 18 on the interior of the first and second housing members 9, 11 come in contact with the sides of the transformer bobbin 36 with a snug fit as the first and second housing members are fastened together. The gussets 18 confine the transformer's movement inside the enclosure to prevent excessive vibration or movement in the event of an impact force to the enclosure.

Figure 4B:
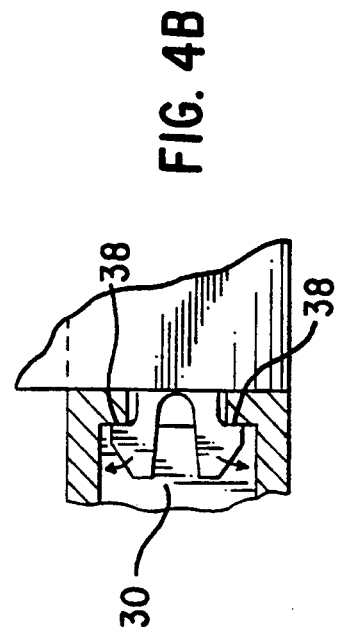
FIG. 4 illustrates the fastening system of the present invention.
Figure 4A:

The snap-together method of the enclosure assembly makes use of the elastic properties of the thermoplastic material from which the enclosure is made. As shown in FIG. 4A, the the tabs 32, 33, of male snap 12, flex inward as it passes through the flanges 34, 35, of female receptacle 14, on the opposing housing member. Once the tabs 32, 33 pass through flanges 34, 35, and into relief area 30, they spring apart and engage with inner ledges 38 of the female receptacle, as shown in FIG. 4B.

Figure 5:
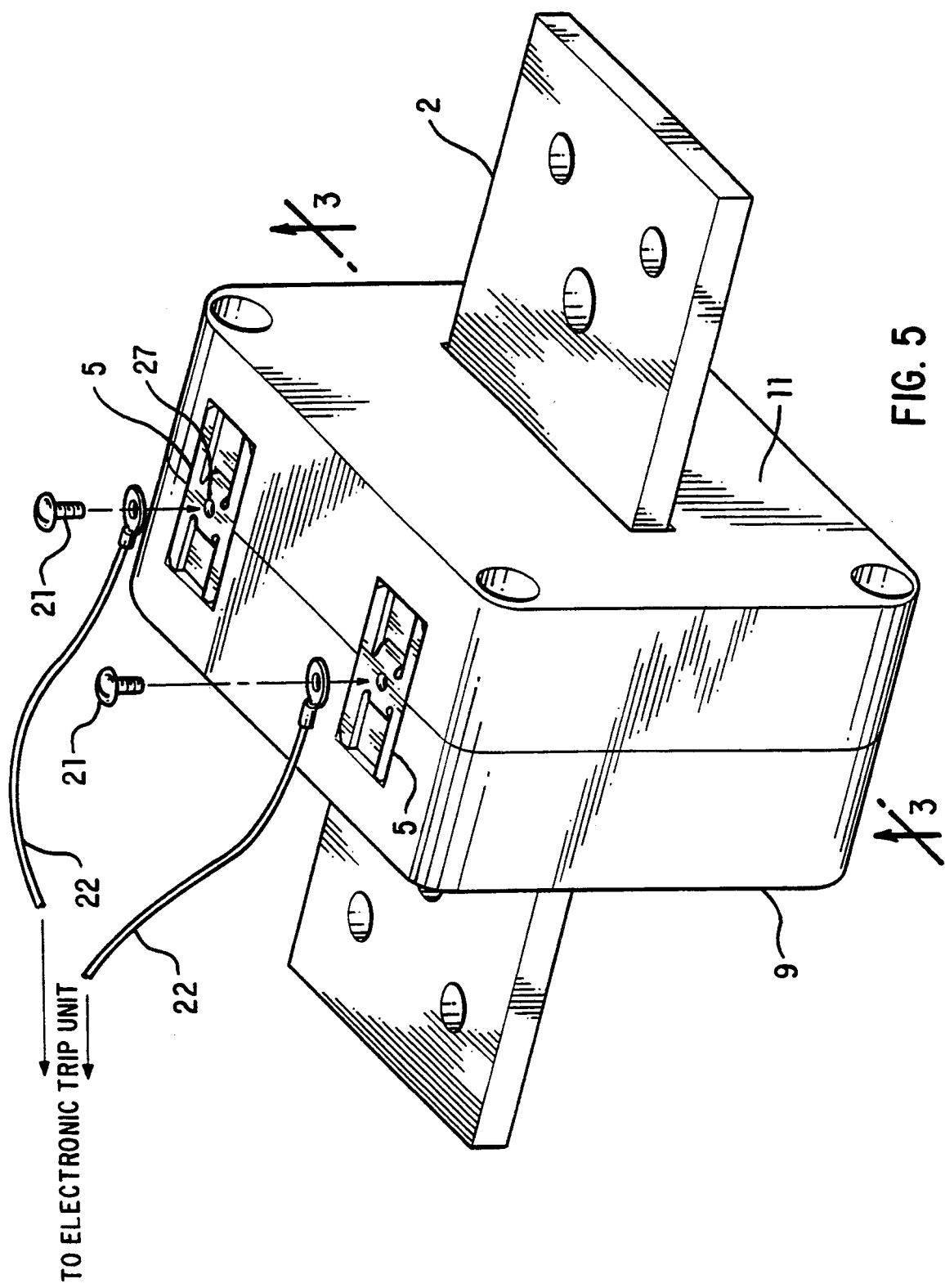
FIG. 5 illustrates a pictorial view of an assembled version of the present invention.

When all four corners of the enclosure have been fastened together in the above state manner, the enclosure assembly is sealed. A machine screw 21 placed in the tapped hole 27 of each wire terminal 5 completes the assembly, as shown in FIG. 5. The machine screws allow external wire leads 22 to be connected to the transformer enclosure assembly.

First and second housing members are shown to be substantially similar with both members having male snaps and female receptacles. However, it is possible that the first housing member may possess all of the male snaps while the second housing member contain all of the female receptacles or vice versa.

While there have been shown and described what are at present considered the preferred embodiments of the invention, it will be obvious to those skilled in the art that various changes and modifications may be made therein without departing from the scope of the invention as defined by the appended claims.

What is claimed is:

1. A transformer assembly comprising:

a current carrying means;

a transformer coupled with said current carrying means;

a plurality of wire leads extending from said transformer;

a first housing member having a hollow cavity therein, said first housing member also having an opening therein for section of said current carrying means;

a second housing member having a hollow cavity therein, said second housing member also having an opening therein for insertion of said current carrying means;

male and female securing means integrally formed on said first housing member, corresponding female and male securing means integrally formed on said second housing member, corresponding ones of said integral male and female securing means adapted to engage in snap-fit fashion so as to removably secure said first and second housing members without any additional securing means, when said housing members are forcibly brought into mutual contact, whereby said hollow cavities in said housing members in combination define a protective encapsulating enclosure for said transformer, said integral male and female securing means further being adapted to be forcibly disengaged from said snap-fit engagement in order to release the secured housing members and provide access to said transformer enclosed therein; and a first and second wire terminal disposed between said first and second housing members for electrically coupling external wiring to said plurality of wire leads extending from said transformer, each of said first and second wire terminals having at least one internal prong and at least one external prong integral thereto which straddle either side of a wall of said first and second housing members, when said first and second housing members are brought in mutual contact, and one of said at least one internal prong being electrically coupled to one of said plurality of wire leads.

2. The assembly as claimed in claim 1, wherein said male securing means comprises a resilient male snap, and said female securing means comprises a female receptacle adapted to removably receive said male snap in snap-fit engagement, said male snap and said female receptacle defined in symmetrically opposed positions such that when said housing members are brought into forced contact, corresponding ones of said male snaps and female receptacles are forced into said snap-fit engagement to define the protective enclosure, thereby sealing said first housing member to said second housing member and encapsulating the transformer therein.

3. The assembly as claimed in claim 1, further comprising gussets disposed on the interior of said first and second housing members, said gussets contacting the transformer as said first and second housing members are secured together and confine the transformer's movement inside said enclosure.

4. The assembly as claimed in claim 1, wherein said electrically coupling means comprises wire terminals that are coupled to the transformer leads, said wire terminals are disposed within relief portions that are located in said first and second housing members.

5. A transformer assembly comprising:

a current carrying means;

a transformer coupled with said current carrying means;

a plurality of wire leads extending from said transformer;

a first housing member having a hollow cavity therein, said first housing member also having an opening therein for insertion of said current carrying means;

a second housing member having a hollow cavity therein, said second housing member also having an opening therein for insertion of said current carrying means;

means integrally formed on said first and second housing members for securing said members together and securing said transformer within said first and second housing members; and a wire terminal disposed on said first and second housing members for electrically coupling external wiring to said transformer therein, said wire terminal having at least one internal prong and at least one external prong integral thereto, said internal prong proximate an inside surface of said first and second housing members for preventing said wire terminal from being pulled away from said transformer assembly and said external prong proximate an external surface of said first and second housing members for preventing said wire terminal from being pushed into said transformer assembly.

6. The assembly as claimed in claim 5, wherein said securing means comprises:

at least one resilient male member integral with said first housing member; and said second housing member having at least one female receptacle therein for receiving said male member, wherein engagement of said male member in said female receptacle brings said first housing member into contact with said second housing member, thereby sealing said first housing member to said second housing member and encapsulating said transformer therein.

7. The transformer assembly as claimed in claim 5, wherein said first and second housing members further having relief portions formed in the external surface thereof for positioning said wire terminal within said relief portions.

8. The transformer assembly as claimed in claim 5, wherein at least one of said plurality of wire leads extending from said transformer being coupled to said internal prong.

9. An enclosure for encapsulating an electrical transformer, said enclosure, comprising:

a first housing member having a hollow cavity therein;

a second housing member having a hollow cavity therein;

means integrally formed on said first and second housing members for securing said members together and securing said transformer within said first and second housing members; and a wire terminal disposed on said first and second housing members, said wire terminal having at least one internal prong and at least one external prong integral thereto, said internal prong proximate an inside surface of said first and second housing members for preventing said wire terminal from being pulled away from said enclosure and said external prong proximate an external surface of said first and second housing members for preventing said wire terminal from being pushed into said enclosure.

10. The enclosure as claimed in claim 9, wherein said first and second housing members further having relief portions formed in the external surface thereof for positioning said wire terminal within said relief portions.

* * * * *